US012386952B2

(12) United States Patent
Adjaoute

(10) Patent No.: US 12,386,952 B2
(45) Date of Patent: *Aug. 12, 2025

(54) ADDRESSABLE SMART AGENT DATA TECHNOLOGY TO DETECT UNAUTHORIZED TRANSACTION ACTIVITY

(71) Applicant: Brighterion, Inc., Purchase, NY (US)

(72) Inventor: Akli Adjaoute, Mill Valley, CA (US)

(73) Assignee: Brighterion, Inc., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/437,347

(22) Filed: Feb. 9, 2024

(65) Prior Publication Data
US 2024/0176877 A1    May 30, 2024

Related U.S. Application Data

(63) Continuation of application No. 17/184,655, filed on Feb. 25, 2021, now Pat. No. 11,899,784, which is a continuation of application No. 15/866,563, filed on Jan. 10, 2018, now abandoned, which is a
(Continued)

(51) Int. Cl.
| | |
|---|---|
| *G06F 21/55* | (2013.01) |
| *G06F 11/34* | (2006.01) |
| *G06F 21/00* | (2013.01) |
| *G06N 20/00* | (2019.01) |
| *G06Q 10/0635* | (2023.01) |
| *H04L 9/40* | (2022.01) |
| *G06Q 10/0639* | (2023.01) |
| *H04L 9/32* | (2006.01) |

(52) U.S. Cl.
CPC ........ *G06F 21/552* (2013.01); *G06F 11/3438* (2013.01); *G06F 11/3476* (2013.01); *G06F 21/00* (2013.01); *G06F 21/55* (2013.01); *G06F 21/554* (2013.01); *G06N 20/00* (2019.01); *G06Q 10/0635* (2013.01); *H04L 63/1433* (2013.01); *G06Q 10/06398* (2013.01); *H04L 9/3231* (2013.01)

(58) Field of Classification Search
CPC ............... G06F 21/552; G06F 11/3438; G06F 11/3476; G06F 21/00; G06F 21/55; G06F 21/554; G06N 20/00; G06Q 10/0635; G06Q 10/06398; H04L 63/1433; H04L 9/3231

See application file for complete search history.

(56) References Cited

U.S. PATENT DOCUMENTS

| | | | | |
|---|---|---|---|---|
| 8,776,168 | B1 * | 7/2014 | Gibson | ................. H04L 63/102 709/225 |
| 2006/0171509 | A1 * | 8/2006 | Berthaud | ............... G06Q 30/02 379/1.04 |

(Continued)

*Primary Examiner* — Cheng-Feng Huang
(74) *Attorney, Agent, or Firm* — Hovey Williams LLP

(57) ABSTRACT

A computer implemented and electronic process is provided that uses artificial intelligence to detect unauthorized activity by an insider or hacker. Electronic systems that employ artificial intelligence and machine learning to detect unauthorized transaction activity by insiders or hackers for a computer network system are also provided. Hardware required for carrying out the invention typically include a plurality of networked computers. Specialized software and/or firmware is typically needed in connection with the hardware for carrying out the invention.

20 Claims, 4 Drawing Sheets

Related U.S. Application Data continuation-in-part of application No. 14/673,895, filed on Mar. 31, 2015, now abandoned.

(56) References Cited

U.S. PATENT DOCUMENTS

| | | | | |
|---|---|---|---|---|
| 2008/0288330 A1* | 11/2008 | Hildebrand | G06Q 10/06398 | 705/7.42 |
| 2010/0125911 A1* | 5/2010 | Bhaskaran | G06Q 10/10 | 715/781 |
| 2013/0283336 A1* | 10/2013 | Macy | G06F 21/40 | 726/1 |
| 2013/0305357 A1* | 11/2013 | Ayyagari | H04L 41/069 | 726/22 |
| 2013/0347116 A1* | 12/2013 | Flores | H04L 63/1433 | 726/25 |

* cited by examiner

Fig. 4

| activity report # | selected parameter | | | | | | | |
|---|---|---|---|---|---|---|---|---|
| | range-1 | range-2 | range-3 | range-4 | range-5 | range-6 | range-7 | range-8 |
| 001 | | | | ● | | | | |
| 002 | | | ● | | | | | |
| 003 | | | | | | | ● | |
| 004 | ● | | | | ● | | | |
| 005 | | | ● | | | | | |
| 006 | | | | ● | | | | |
| 007 | | | | ● | | | | |
| 008 | | | | | ● | | | |
| 009 | | | ● | | | | | |
| 010 | | | | ● | | | | |
| 011 | | | | | ● | | | |
| 012 | | | | ● | | | | |
| 013 | | | ● | | | | | |
| 014 | | | ● | | | | | |

ADDRESSABLE SMART AGENT DATA TECHNOLOGY TO DETECT UNAUTHORIZED TRANSACTION ACTIVITY

CROSS REFERENCE TO RELATED PATENT APPLICATIONS

This application is a continuation of and claims priority to identically titled U.S. patent application Ser. No. 17/184,655, filed Feb. 25, 2021, which, itself, is a continuation of and claims priority to identically titled U.S. patent application Ser. No. 15/866,563, filed Jan. 10, 2018, which, itself, is a continuation-in-part of and claims priority to U.S. patent application Ser. No. 14/673,895, entitled "ADDRESSABLE SMART AGENT DATA STRUCTURE," filed Mar. 31, 2015 by inventor Akli Adjaoute, and the disclosures of the listed earlier-filed non-provisional applications are hereby incorporated by reference in their entireties into the current patent application.

BACKGROUND OF THE INVENTION

The present invention generally relates to technology that involve artificial intelligence and electronic machine learning. More particularly, the present invention relates to independent and addressable smart agent data structures assignable in large populations for recording and profiling the transaction behaviors of identifiable entities in a stream of incoming transaction records. In other words, the subject matter of the claims below may take the form of a machine, a process, a composition of matter, and/or an item of manufacture.

Big business is now routinely controlled by large computer systems and networks that operate on a scale so vast and quick as to be incomprehensible to average people. These computer systems and networks are, in turn, steered, monitored, and cared for by system administrators that have super access to all parts.

If the access privileges that system "admins" hold are abused, major economic and security damage can be caused all too silently to a company.

It has not been lost on investigators and analysts in general that evildoers and other perpetrators will behave in unusual ways, especially during the moments leading up to the commission of a crime. With computer systems, bad people often get away with impersonating real authorized users, but their odd behaviors will give them away.

So too with business insiders who have authorized access, but then abuse their privileges. But a special case is presented with system administrators because their behaviors are normally very chaotic, and patterns of normal behavior are absent even when their privileges are not being abused.

Years ago, Krishna Gopinathan, et al., proposed an automated system for fraud detection using predictive modeling. See, U.S. Pat. No. 5,819,226. Neural networks were trained with historical and past transactional data, and used thereafter during operation to identify suspicious transactions based on learned relationships among the known variables. Their system periodically monitored a compliance metric of its fraud detection rate and its false positive rate. When their compliance metric fell below a minimum value, the system would automatically redevelop and adapt the fraud model.

Periodic redevelopment of the models does not self-adapt. Instead, prior art systems constantly needs ever-improving training data that may not exist. The only diversity amongst the cardholders is in their respective transactions, not the fraud models being applied to them. Compliance only initially reaches optimum, and falls off immediately. Worse, each subsequent model redevelopment costs time offline. New kinds of fraud that evolve will disrupt such models because they're not equipped to evolve in tandem.

The shortcomings with these neural network models is needing to know what output is desired for each input before any training begins. Such can be very limiting. During training, if any of the desired outputs are left unknown for some input patterns, new incidences of fraud and abuse will go undetected in real-time. Detection that lags infection will exact a cost.

Neural networks, statistical modeling and profiling have been applied to fraud and abuse detection. But for them to be effective, they need a large database of cases in which fraud and abuse were detected. However, for this to work later the fraudulent methods and abuse must not have changed much. Such tools are impotent when the fraud and abuse either too closely resembles normal activity, or if it constantly shifts as the hackers adapt to changing surveillance strategies and technologies.

Conventional analytic solutions, even those that transaction to be non-hypothesis based, still operate within very rigid boundaries. They are either designed or tuned to look at various scenarios in such a way that they will only catch a limited range of the leakage problem. When something truly surprising happens, or a variation occurs that was not anticipated, systems based on such models fail to complete.

Modern systems need to be sophisticated, unsupervised, and learn as they go. New behaviors of fraud and abuse arise daily.

In other words, conventional solutions to fraud have obtained only mediocre results. They lack scalability and always require high manual effort. We can do better.

SUMMARY OF THE INVENTION

In a first embodiment, a computer implemented and electronic process is provided that uses artificial intelligence to detect unauthorized activity by an insider or hacker. The process includes the steps of: analyzing activities and tasks of an administrator to detect any abnormal behavior using smart agent and artificial intelligence technologies; beginning and calling into action the smart agent that represents the system administrator and other smart agents with an addressable call-output; testing relationships of attributes of the smart agents included in a series of events and logs to a corresponding profile of the administrator and servers; establishing a reference of normal behavior profile to each administrator and servers using past activities of the administrator; and/or warning of unauthorized administrator activities. Activities may comprises the sub-activities of: an instant behavior deviates from the reference normal behavior profile of the system administrator; an instant behavior deviates from the reference normal behavior of the server activities; and/or an age timeout occurring before the state machine has started; and/an age time not finishing in response to an addressable call-in.

Additional steps of the process include, for example, building long term profiles, recursive profiles, real time profiles for each smart-agent by learning from system administrator activities; analyzing the system administrator activities to determine if activity reported in each activity report is classified as normal, timely, and harmonious with an instant task and job priorities; testing to see what other addressable triggers-out and addressable call-out from the testing and scheduling issuance in a selected clock cycle; warning of an unauthorized transaction activity based on a profile by testing and issuing objections for smart agents that were not called into action yet were scheduled.

When the process is carried out, the warning step takes place when at least two, three, or more of the sub-activities occur. Additional sub-activities include, for example, when the instant behavior deviates substantially from the reference normal behavior profile. The inventive process may take place over the internet or a portion thereof, e.g., via the world wide web, or via the dark web.

In another embodiment, the invention provides an electronic system that employs artificial intelligence and machine learning to detect unauthorized transaction activity by insiders or hackers for a computer network system. The electronic system comprises: a plurality of networked computers; electronic means for analyzing activities and tasks of an administrator to detect any abnormal behavior using smart agent and artificial intelligence technologies; means for calling a smart-agent state machine for the administrator into operation with a smart-agent call-in trigger with an addressable output; means for beginning and calling into action other smart agents with an addressable call-output; means for testing relationships of transactional attributes of the smart agents included in a series of transactions to a corresponding profile of the administrator; means for establishing a reference normal behavior profile from attributes of past transactions of the administrator; and/or electronic means for warning of an unauthorized administrator transaction activity. The unauthorized activity may comprise the sub-activities of: (a) an instant behavior deviates from the reference normal behavior profile for each system administrator or servers; (b) an age timeout occurring before the state machine has started; and/or (c) an age time not finishing in response to an addressable call-in.

Other and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 4 is a table representing a series of activity reports #001-#014 filtered for a selected parameter.

DETAILED DESCRIPTION OF THE INVENTION

Definitions and Overview

Figure 1:
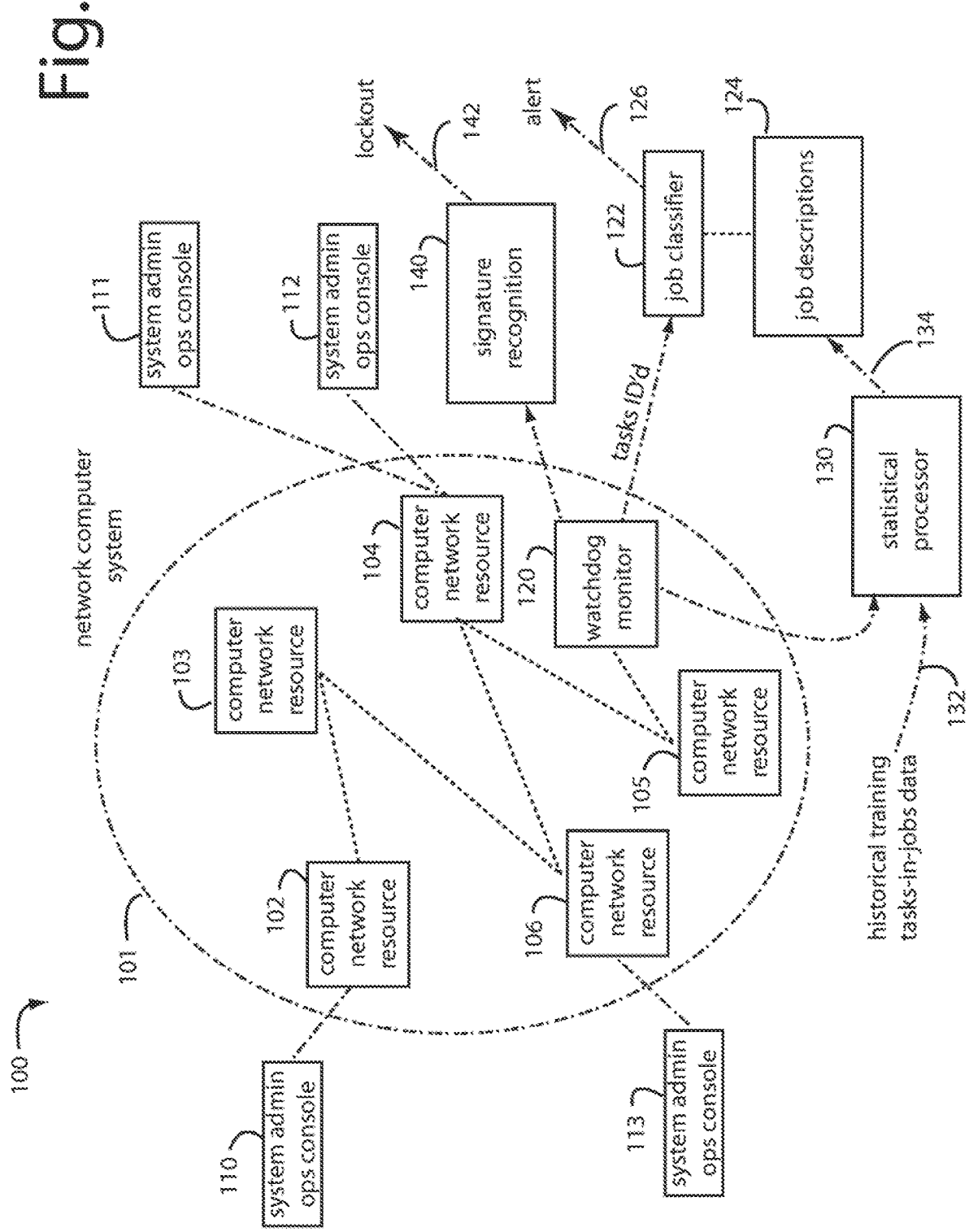
FIG. 1 is a functional block diagram of an improved network computer system with a group of several network-connected and interoperating computer network resources accessible by system administrators through system administrator consoles.

Before describing the invention in detail, it is to be understood that the invention is not generally limited to specific electronic platforms or types of computing systems, as such may vary. However, the invention does not typically use generic computers either that would trigger any patent ineligibility issues accordingly to case law associated with 35 USC 101.

It is also to be understood that the terminology used herein is intended to describe particular embodiments only, and is not intended to be limiting.

Furthermore, as used in this specification and the appended claims, the singular article forms "a," "an," and "the" include both singular and plural referents unless the context clearly dictates otherwise. Thus, for example, reference to "an administrator" includes a plurality of administrators as well as a single administrator, reference to "an authorization limit" includes a single authorization limit as well as a collection of authorization limits, and the like.

In addition, the appended claims are to be interpreted as reciting subject matter that may take the form of a new and useful process machine, manufacture, and/or composition of matter, and/or any new and useful improvement thereof instead of an abstract idea.

In this specification and in the claims that follow, reference is made to a number of terms that are defined to have the following meanings, unless the context in which they are employed clearly indicates otherwise:

The terms "electronic," "electronically," and the like are used in their ordinary sense and relate to structures, e.g., semiconductor microstructures, that provide controlled conduction of electrons or other charge carriers, e.g., microstructures that allow for the controlled movement of electrons and holes in electron clouds.

The term "internet" is used herein in its ordinary sense and refers to an interconnected system of networks that connects computers around the world via the TCP/IP and/or other protocols. Unless the context of its usage clearly indicates otherwise, the term "web" is generally used in a synonymous manner with the term "internet."

The term "smart agent" is used herein as a term of art to refer to specialized technology that differs from prior art technologies that do not involve the use of artificial intelligence and machine learning, e.g., as described in U.S. Patent Application Publication No. 2013/0305357 to Ayyagari (directed generally to satellite-based network security monitoring for dangerous threat detection), U.S. Pat. No. 8,561,007 to Challenger et al. (directed generally to distributable serializable finite state machines for flow control in a distributed computing environment), and U.S. Patent Application Publication No. 2014/0082434 to Knight et al. (directed generally to safety system challenge- and response using modified watchdog timer). In general, the smart agent technology described herein, rather than being pre-programed to try to anticipate every possible scenario or relying on pre-trained models, employs artificial intelligence technology that tracks and adaptively learns the specific behavior of every entity of interest over time. Thus, continuous one-to-one electronic behavioral analysis provides real-time actionable insights and/or warnings. In addition, smart agent technology described herein engages in adaptive learning that continually updates models to provide new intelligence. Furthermore, the smart agent technology solves technical problems associated with massive databases and/or data processing. Experimental data show about a one-millisecond response on entry-level computer servers. Such a speed is not achievable with prior art technologies. Additional differences between the smart agent technology claimed and prior so-called "smart agent" technology will be apparent upon review of the disclosure contained herein.

The terms "substantial" and "substantially" are used in their ordinary sense and are the antithesis of terms such as "trivial" and "inconsequential." For example, when the term "substantially" is used to refer to behavior that deviates from a reference normal behavior profile, the difference cannot constitute a mere trivial degree of deviation. The terms "substantial" and "substantially" are used analogously in other contexts involve an analogous definition.

Smart Agent Technology, Generally

To describe the invention fully, it is helpful to provide a generalized primer pertaining to describe smart agent technology. Smart agent technology is the only technology that has the ability to overcome the limits of the legacy machine learning technologies allowing personalization, adaptability and self-learning.

Smart-agent technology is a personalization technology that creates a virtual representation of every entity and learns/builds a profile from the entity's actions and activities. In the payment industry, for example, a smart-agent is associated with each individual cardholder, merchant, or terminal. The smart agents associated to an entity (such as a card or merchant) learns in real-time from every transaction made and builds their specific and unique behaviors over-time. There are as many smart agents as active entities in the system. For example, if there are 200 million cards transacting, there will be 200 million smart agents instantiated to analyze and learn the behavior of each. Decision-making is thus specific to each cardholder and no longer relies on logic that is universally applied to all cardholders, regardless of their individual characteristics. The smart agents are self-learning and adaptive since they continuously update their individual profiles from each activity and action performed by the entity.

The following are some examples which highlight how the smart agent technology differs from legacy machine learning technologies.

In an email filtering system, smart agents learn to prioritize, delete, forward, and email messages on behalf of a user. They work by analyzing the actions taken by the user and by learning from each. Smart agents constantly make internal predictions about the actions a user will take on an email. If these predictions prove incorrect, the smart agents update their behavior accordingly.

In a financial portfolio management system, a multi-agent system may consist essentially of smart agents that cooperatively monitor and track stock quotes, financial news, and company earnings reports to continuously monitor and make suggestions to the portfolio manager.

Smart agents do not rely on pre-programmed rules and do not try to anticipate every possible scenario. Instead, smart agents create profiles specific to each entity and behave according to their goals, observations, and the knowledge that they continuously acquire through their interactions with other smart agents. Each Smart agent pulls all relevant data across multiple channels, irrespectively to the type or format and source of the data, to produce robust virtual profiles. Each profile is automatically updated in real-time and the resulting intelligence is shared across the smart agents. This one-to-one behavioral profiling provides unprecedented, omni-channel visibility into the behavior of an entity.

Smart agents can represent any entity and enable best-in-class performance with minimal operational and capital resource requirements. Smart agents automatically validate the coherence of the data, perform the features learning, data enrichment as well as one-to-one profiles creation. Since they focus on updating the profile based on the actions and activities of the entity, they store only the relevant information and intelligence rather than storing the raw incoming data they are analyzing, which achieves enormous compression in storage.

Legacy technologies in machine learning generally relies on databases. A database uses tables to store structured data. Tables cannot store knowledge or behaviors. Artificial intelligence and machine learning systems requires storing knowledge and behaviors. Smart-Agents bring a powerful, distributed file system specifically designed to store knowledge and behaviors. This distributed architecture allows lightning speed response times (below about one millisecond) on entry level servers as well as end-to-end encryption and traceability. The distributed architecture allows for unlimited scalability and resilience to disruption as it has no single point of failure.

Exemplary Embodiments of the Invention and Associated Contextual Info

FIG. 1 represents an improved network computer system 100 with a group 101 of several network-connected and interoperating computer network resources 102-106 accessible by system administrators through system administrator consoles 110-113. The network computer system 100 is vulnerable to malicious attacks by company insiders and hackers posing as system administrators (admins), e.g., via connections with the Internet. A principal objective of the present invention is to prevent or at least limit the damage that can be caused by purported system administrators.

The system administrator operator consoles 110-113 have privileged access to system resources 102-106 by way of selectable operating system tasks. These selectable operating system tasks include the typical system calls that conventional operating systems provide, e.g., file read/write, execute program, print, display, communication, etc.

The network computer system 100 is modified and adapted beyond a conventional arrangement of hardware to further include a watchdog monitor 120 connected to detect, record, and analyze which selectable operating system tasks each system administrator using a system administrator operator console 110-113 completes and the sequence of those task completes. A job classification processor 122 is connected to monitor and determine which, if any, of a plurality of system administrator jobs 124 by job description such individual system administrator's console completes and sequence of those particular task completes conforms to. For example, Job-A includes only tasks t1-t7, Job-B includes only tasks t8-t11, Job-C includes only tasks t12-t20, but Job-D also shares tasks t1-t7 but further also uses tasks t21-t33. A completing of any of tasks t34-t100 would be reason for concern because no authorized or described job includes any of those. Also, a sequence of tasks that danced over more than one job before finishing the last job is also troublesome.

| JOB DESCRIPTION BY INCLUDED TASKS | | | | | |
|---|---|---|---|---|---|
| Job | t1-t7 | t8-t11 | t12-t20 | t21-t33 | t-t100 |
| A | X | | | | |
| B | | X | | | |
| C | | | X | | |
| D | X | | | X | |

A security alert output 126 is constructed to enable management's attention to be called to suspicious system administrator activity if any individual system administrator's console completes and sequence of task completes do not conform to any one of the plurality of system administrator jobs 124.

A statistical processor 130 receives task records from the watchdog monitor 120 during live operation, or historical training of tasks-in-jobs data 132 during training. The task records are related to which operating system tasks have been selected by system administrators to advance, or complete, particular system administrator jobs by a group of peers, and the statistical processor is programmed to set boundaries-of-inclusion 134 for which operating system tasks are used by a majority in the peer group to complete each particular system administrator job.

Thus a rogue system administrator can be distinguished from their peer group for highlighting and more intense scrutiny.

Some system administrator attacks follow recognizable patterns and have signatures that can be used to stop short any new such attack. A signature recognition processor 140 is also connected to receive task records from the watchdog monitor 120 and organizes them into single-source sequences according to the purported system administrator completing them. Signature recognition processor 140 compares these single-source sequences to particular sequences of operating system tasks that were infamously used by hackers and purported system administrators to compromise similar computer network systems. Signature recognition processor 140 can issue a lockout command 142 or flag the security alert output 126 if a match develops. A lockout output 142 triggers an automated logging-out of the offending purported system administrator and a quashing of their secure access credentials.

It would not be unusual for a conventional network computer system 101 to be trusted to keep secure the account records and personal details of ten million credit card accountholders. A typical system administrator has the system access privileges needed access all of these account records and personal details, and to engage in a massive data breach by spiriting off the sensitive data to evil doers. But, in improved network computer system 100 the operation system tasks and sequences that such would employ to carry off this crime would either have a recognizable signature to it or would not fit in any defined job.

In general, embodiments of the present invention include an artificial intelligence behavior analysis of system administrators. Most implementations require specialized software limited to the behavior analysis of system administrators within the confines of their particular job tasks. Such software is operated on computer networks specifically improved and modified to have access to the resources involved in the job tasks assigned to the relevant system admins, and has storage to maintain profiles of their individual and respective behaviors in view of those job tasks. It would also be sensible to put access to all of this outside the abilities of the system administrators being supervised, e.g., physical compartmentalization of the system's resources.

Recently, one employer looking to hire a System Administrator described the position as follows:

Essential Functions

The System Administrator (SA) is responsible for effective provisioning, installation/configuration, operation, and maintenance of systems hardware and software and related infrastructure. This individual participates in technical research and development to enable continuing innovation within the infrastructure. This individual ensures that system hardware, operating systems, software systems, and related procedures adhere to organizational values, enabling staff, volunteers, and Partners. This individual will assist project teams with technical issues in the Initiation and Planning phases of our standard Project Management Methodology. These activities include the definition of needs, benefits, and technical strategy; research & development within the project life-cycle; technical analysis and design; and support of operations staff in executing, testing and rolling-out the solutions. Participation on projects is focused on smoothing the transition of projects from development staff to production staff by completing operations activities within the project life-cycle. This individual is accountable for Linux and Windows systems that support GIS infrastructure; Linux, Windows and Application systems that support Asset Management. Responsibilities include SA engineering and provisioning, operations and support, maintenance and research and development to ensure continual innovation.

SA Engineering and Provisioning

1. Engineering of SA-related solutions for various project and operational needs. 2. Install new/rebuild existing servers and configure hardware, peripherals, services, settings, directories, storage, etc. in accordance with standards and project/operational requirements. 3. Install and configure systems such as supports GIS infrastructure applications or Asset Management applications. 4. Develop and maintain installation and configuration procedures. 5. Contribute to and maintain system standards. 6. Research and recommend innovative, and where possible automated approaches for system administration tasks. Identify approaches that leverage our resources and provide economies of scale.

Operations and Support

7. Complete daily system monitoring, verifying the integrity and availability of all hardware, server resources, systems and key processes, reviewing system and application logs, and verifying completion of scheduled jobs such as backups. 8. Complete regular security monitoring to identify any possible intrusions. 9. Complete daily backup operations, ensuring all required file systems and system data are successfully backed up to the appropriate media, recovery tapes or disks are created, and media is recycled and sent off site as necessary. 10. Complete regular file archival and purge as necessary. 11. Create, change, and delete user accounts per request. 12. Provide Tier IIIother support per request from various constituencies. Investigate and troubleshoot issues. 13. Repair and recover from hardware and software failures. Coordinate and communicate with impacted communities.

Maintenance

14. Apply operating system patches and upgrades on a regular basis, and upgrade administrative tools and utilities. Configure/add new services as necessary. 15. Upgrade and configure system software that supports GIS infrastructure applications or Asset Management applications per project or operational needs. 16. Maintain operational, configuration, or other procedures. 17. Complete periodic compliance reporting to support capacity planning. 18. Complete ongoing compliance tuning, hardware upgrades, and resource optimization as required. Configure CPU, memory, and disk partitions as required. 19. Maintain data center environmental and monitoring equipment.

Knowledge/Skills

1. Bachelor (4-year) degree, with a technical major, such as engineering or computer science. 2. Systems Administration/System Engineer certification in Unix and Microsoft. 3. Four to six years system administration experience.

Complexity/Problem Solving
1. Position deals with a variety of problems and sometime has to decide which answer is best. The question/issues are typically clear and requires determination of which answer (from a few choices) is the best.
Discretion/Latitude/Decision-Making
1. Decisions normally have a noticeable effect department-wide and company-wide, and judgment errors can typically require one to two weeks to correct or reverse.
Responsibility/Oversight—Financial & Supervisory
1. Functions as a lead worker doing the work similar to those in the work unit; responsibility for training, instruction, setting the work pace, and possibly evaluating compliance. 2. No budget responsibility.
Communications/Interpersonal Contacts
1. Interpret and/or discuss information with others, which involves terminology or concepts not familiar to many people; regularly provide advice and recommend actions involving rather complex issues. May resolve problems within established practices. 2. Provides occasional guidance, some of which is technical.
Working Conditions/Physical Effort
1. Responsibilities sometimes require working evenings and weekends, sometimes with little advanced notice. 2. No regular travel required.

System administrators can therefore come and go, night and day, access resources they never accessed before, and can pretty much have a free run of an entire business enterprise without raising suspicions. Human administrator Eric Snowden recently took advantage of his system administrator capabilities to cause the United States Government a major embarrassment through his now-famous data breach.

Many other jobs related to system administration may be separate positions within a computer support or Information Services (IS) department. Database administrators (DBA) maintain a database system, and is responsible for the integrity of the data and the efficiency and compliance of the system. Network administrators maintain network infrastructures such as switches and routers, and diagnose problems with these or with the behavior of network-attached computers. Security administrators are specialists in computer and network security, including the administration of firewalls and other security devices, and consult on general security measures. Web administrators maintain webserver services (such as Apache or IIS) that allow for internal or external access to web sites. Tasks include managing multiple sites, administering security, and configuring necessary components and software. Responsibilities may also include software change management. Computer operators do routine maintenance and upkeep, such as changing backup tapes or replacing failed drives in a redundant array of independent disks (RAID). Such tasks usually require physical presence in the room with the computer, and may require a similar level of trust as system admins, since they have access to sensitive data.

Postmasters administer mail servers. Storage (SAN) Administrators create, provision, add or remove Storage to/from Computer systems. Storage can be attached locally to the system or from a storage area network (SAN) or network-attached storage (NAS). The administrator can also create file systems from newly added storage. Often, those who begin as a member of the technical support staff or a computer operator, will be promoted to a "sysadmin" position after gaining wider experience on the job.

All of these insider positions involve a great deal of trust and risk exposure by business enterprises and even governments and their militaries and other agencies and departments.

By one account, system administrators are responsible for the technical design, planning, implementation, and the highest level of compliance tuning and recovery procedures for mission critical enterprise systems. They serve as technical experts in the area of system administration for complex operating systems. They recommend the redesign and configuration of operating systems and system applications. System administrators investigate and analyze system requirements feasibility and develop system specifications. They identify methods and solutions, and provide project leadership and management. System administrators often provide comprehensive supervision of operations staff.

Typical Duties and Responsibilities of a System Administrator

Manages the day-to-day operations of the host computers by monitoring system compliance, configuration, maintenance and repair. Ensures that records of system downtime and equipment inventory are properly maintained. Applies revisions to host system firmware and software. Works with vendors to assist support activities. Develops new system and application implementation plans, custom scripts and testing procedures to ensure operational reliability. Trains technical staff in how to use new software and hardware developed and/or acquired. Supervises Operations staff including hiring, training, evaluating and disciplining. May guide or provide work direction to technical staff, contract staff and/or student employees. Determines appropriate coverage for all hours of operation. Completes troubleshooting as required. As such, leads problem-solving efforts often involving outside vendors and other support personnel and/or organizations. Establishes, maintains and manages users Unix accounts. Installs, modifies and maintains systems and utility software on server computer systems. Provides server support related to other software. Establishes guidelines and methods for the installation and management of the host computer operating systems, disk anays, fiber channel switches, tape libraries and other components. Ensures high availability and acceptable levels of compliance of mission critical host computer resources. Develops procedures to maintain security and protect systems from unauthorized use, acts of nature and user abuse. Develops procedures, programs and documentation for backup and restoration of host operating systems and host-based applications. Develops and coordinates project directions and schedules to maximize benefits and minimize impacts on the customer organizations. Provides leadership in planning and implementation of projects for computer operations and enterprise systems administration. Develops tools, procedures, and training sessions for Operations, Client Support and Systems Development staff to assist with work. Manages the data center and computer host systems including hardware, software and equipment such as air-conditioning system, UPS (uninterrupted power system) and fire protection system. Stays current with technological developments in systems administration technology and recommends ways to take advantage of new technology.

On the computer network system itself, a system administrator's technical responsibilities might further include: Analyzing system logs and identifying potential issues with the computer systems; Introducing, integrating, and testing new technologies into existing data center environments; Routine audits of systems and software. Applying operating system updates, patches, and configuration changes; Installing and configuring new hardware and software. Adding, removing, or updating user account information, resetting passwords; Answering technical queries and assisting users; Security; Documenting system configurations; Troubleshooting reported problems; Tuning system compliance; Confirming that the network infrastructure is up and running; Configuring, adding, and deleting file systems. A monitor and log that tracks an individual system administrator should see these kinds of things going on (and probably nothing else outside their formal authority). For example, large print jobs or transfers of files or databases to USB drives would be unusual and hard to justify.

In another example, the routine duties of a database administrator include: Installing and upgrading the database server and application tools; Allocating system storage and planning future storage requirements for the database system; Modifying the database structure, as necessary, from information given by application developers; Enrolling users and maintaining system security; Ensuring compliance with database vendor license agreement; Controlling and monitoring user access to the database; Monitoring and optimizing the compliance of the database; Planning for backup and recovery of database information Maintaining archived data, Backing up and restoring databases; Contacting database vendor for technical support; Generating various reports by querying from database as per need. So a monitor and log that tracks an individual database administrator should see these kinds of things going on.

Individuals develop their own styles and habits. They do things in particular sequences, use a kit of favorite tools, write scripts they trust and have used before, and react in repeatable ways to various stimuli.

In an embodiment of the present invention, a particular system administrator's jobs are artificially categorized in the following way:

| Job Code | Job Description | Frequency |
|---|---|---|
| A | Analyzing systems logs and identifying potential issues with computer systems | Daily, in background |
| B | Introducing, integrating, and testing new technologies into existing data center environments | As needed |
| C | Routine audits of systems and software | Periodic, maybe monthly |
| D | Applying operating systems updates, patches and configuration changes | As such are released |
| E | Installing and configuring new hardware and software | As received, and traceable to purchase orders |
| F | Adding, removing, or updating user account information | As requested, and in part related to human resources activities. |
| G | Answering technical queries and assisting users | As requested, and linkable to particular users |
| H | Security | Ongoing |
| J | Documenting system configurations | As configuration changes occur, and traceable to work orders |
| K | Troubleshooting reported problems | As requested, and linkable to particular users |
| L | Tuning system compliance | Random |
| M | Confirming that the network infrastructure is up and running | Periodic and should be harmless |
| N | Configuring, adding, transferring, copying, and deleting file systems | Who, what where, when, and why all need to be within bounds |

Every system administrator's days, weeks, and months will be divided amongst these jobs, and some may have the personal freedom to do them in any order, sequence, or priority that they choose. Herein is a first aspect of their individual and peer group behaviors that can be tracked, profiled, and recognized.

Jobs are assigned to system administrators and often well-planned even months in advance. As a group, the system administrators will engage various tasks they have in a toolkit in order to complete each job. Not every system administrator will approach every job with the same task completes and they may vary in the sequences of task completes. But over time patterns will emerge of normal behavior and certainty training data can be used to initiate what is normal behavior.

What is meant by "task" herein is a particular operating system activity like reading a file, writing a file, copying a file, downloading a file, executing a script, printing a page, accessing a sensitive data file, running a program, displaying a graphic, etc.

During live watchdog operation, the technical behaviors of a company's system administrators are monitored by embodiments of the present invention. More precisely, the particular tasks they complete for any reason are tracked as are the sequences of their use.

The various jobs a system administrator is authorized to do have well-defined limits, and the tasks employable to complete each of those jobs are also limited by job descriptions. So the use of a task not in any job description, or the sequencing of tasks not staying within a single job description until the job is completed are suspect.

System administrators normally stay on a particular job until it's completed and before moving on to a next. So bouncing around by using tasks unique to more than one job is questionable.

So, if a particular system administrator is observed by a watchdog monitor to have completed a task, or a sequence of tasks, not found in any one authorized job description, then that particular system administrator warrants more intense scrutiny and may even require automated deactivation.

For example, the job description of a particular "JOB-A" expects system administrators to use tasks "T1-T7". In watchdog mode, eight system administrators 1-8 were observed to employ the following tasks.

| | JOB-A | | | | | | | | |
|---|---|---|---|---|---|---|---|---|---|
| | T1 | T2 | T3 | T4 | T5 | T6 | T7 | T8 | T9 |
| SA1 | 1 | 1 | 0 | 0 | 0 | 1 | 0 | 1 | 1 |
| SA2 | 1 | 1 | 0 | 0 | 0 | 0 | 0 | 0 | 1 |
| SA3 | 1 | 1 | 0 | 1 | 1 | 0 | 0 | 0 | 1 |
| SA4 | 0 | 0 | 0 | 0 | 0 | 0 | 0 | 1 | 1 |
| SA5 | 1 | 0 | 0 | 1 | 1 | 0 | 0 | 0 | 1 |
| SA6 | 1 | 1 | 0 | 1 | 1 | 1 | 0 | 1 | 0 |
| SA7 | 1 | 1 | 0 | 1 | 1 | 1 | 0 | 0 | 0 |
| SA8 | 1 | 1 | 0 | 1 | 1 | 1 | 0 | 0 | 1 |

The technical behavior of System administrator 4 is odd and out-of-character compared to their peers, System administrator 1-3 and 5-8. Specifically, the peer group all employed task t1, most used task t2, a majority used task t3, t4, all used task t4 if they used t3, etc.

A case-based-reasoning (CBR) system can be employed to help analyze the behavior of system administrators. A general purpose fraud classifier, one-size-fits-all for system administrators is not going to be very useful. A better implementation is based on the smart agents described herein and in U.S. patent application Ser. No. 14/673,895, the disclosure of which is incorporate by reference.

In various embodiments of the present invention, a smart-agent with CBR is virtually "attached" and assigned to every individual system admin, job, and task. Storage room for their respective profiles are maintained in secure memory.

Figure 2:
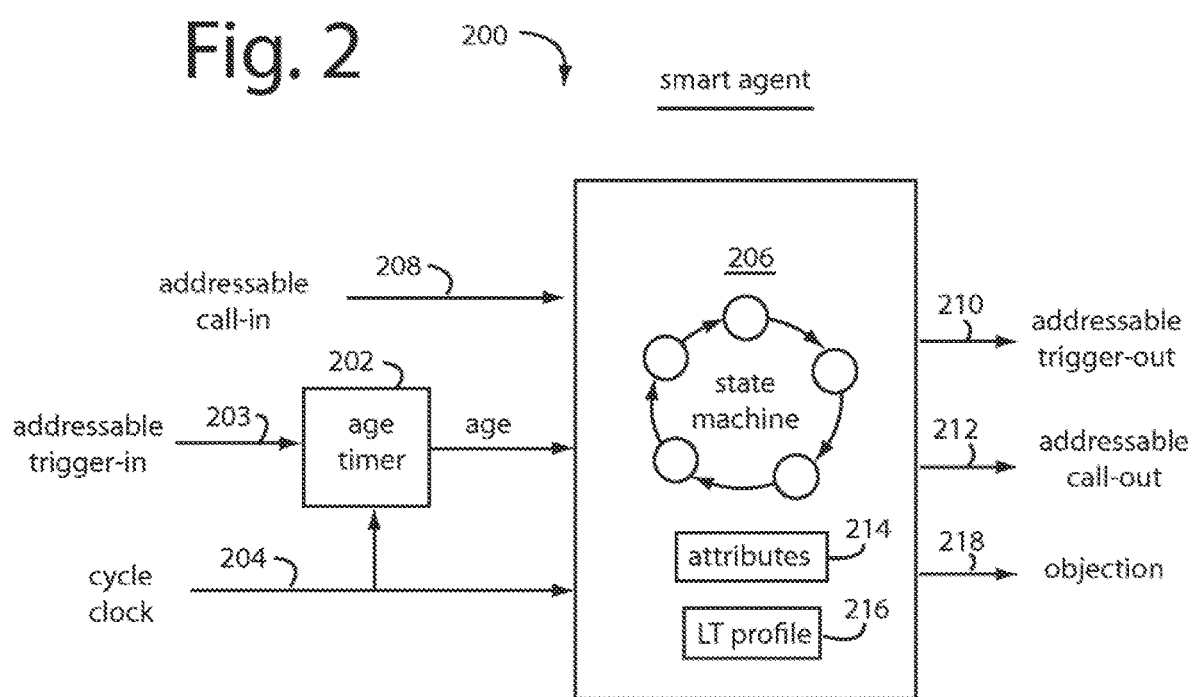
FIG. 2 is a functional block diagram of smart-agent embodiment of the present invention useful in the system of FIG. 1.

Referring now to FIG. 2, each smart-agent 200 is addressable and has a timer 202 can be triggered into life with an addressable trigger-in 203 and begin aging tick-by-tick with a cycle clock 204. A state machine 206 can be addressably called into action like a "call" to a subroutine with an addressable call-in 208. An addressable trigger-out 210 can trigger into life other smart-agents. An addressable call-out 212 can call into action other smart-agents as if they were addressable subroutines. A list of attributes 214 describes, in an exemplary instance here, the particular tasks employed by this particular job, or the tasks that a particular system administrator can employ. A long term (LT) profile 216 is a memory log of the past activities that this smart-agent was involved in, and is able to develop a behavior profile of what is "normal" behavior for this entity.

An objection 218 can issue by the state machine 206 if the instant behavior for this entity seems abnormal, or if an age timeout 220 occurs before the state machine has run or finished in response to an addressable call-in 208.

Activity reports 220 are cleaned up, filtered for the particular smart-agent 200, and used to build LT profile 216. As each report comes in its information is inspected by state machine 206 to see if the activity was expected, normal, timely, respected priorities, etc. For example, if the activity was the running of a task.

Once an addressable call-in 208 is received, the state machine 206 will typically consult the attributes 214 to see what other addressable triggers-out 210 and addressable calls-out 212 should issue and in which clock cycles. For example, if a Job-A requires tasks t1-t7 to be run, then the Job-A smart-agent will trigger all seven of the T1-T7 smart-agents. If they timeout (age is too old) without having been employed in a call by the system admin, then the ones who weren't called into action will issue objections.

Here, in this Application, an individual smart-agent 200 is spawned and attached to every identifiable system admin, job, and task. Each such smart-agent has its own characteristic attributes, e.g., a job smart-agent will have task attributes corresponding to every task that this particular job has called, should call, or should not call. The tasks it calls can have a priority order, and that would be another attribute and another smart-agent. The various smart-agents are interconnected, interrelated and each can be randomly accessed and consulted.

For example, any job smart-agent can have its LT profile 216 accessed to see who has called it, triggered it, it has called, it has triggered, etc. It can further be queried as to its attributes 214. It is therefore as easy to query what jobs have been done by which system administrators as it is to query which system administrators have done which jobs.

A CBR case consists of a problem, a previous solution that worked, and remarks about how the solution was derived. Case-based reasoning can be formalized as a four-step process:

| | |
|---|---|
| Retrieve | For each target problem, cases are retrieved from memory relevant to solving it. |
| Reuse | The solution is mapped from the previous case to the target problem and may involve adapting the solution to fit the new situation. |
| Revise | The new solution is tested and, if necessary, revised. |
| Retain | After a solution has been used successfully on the target problem, the resulting experience is stored as a new case in memory. |

Herein, a case comprises a system administrator's job task and the solutions comprise what particular system administrators did to do that job task. (There being many ways to solve a problem or do a job that will express the personalities involved.)

Each system administrator activity report comes in like the payment transactions that are described in the Applicant's previous patent applications involving payment fraud detection. Here, system administrator activities can be fraudulent, suspicious, or apparently acceptable.

Figure 3:
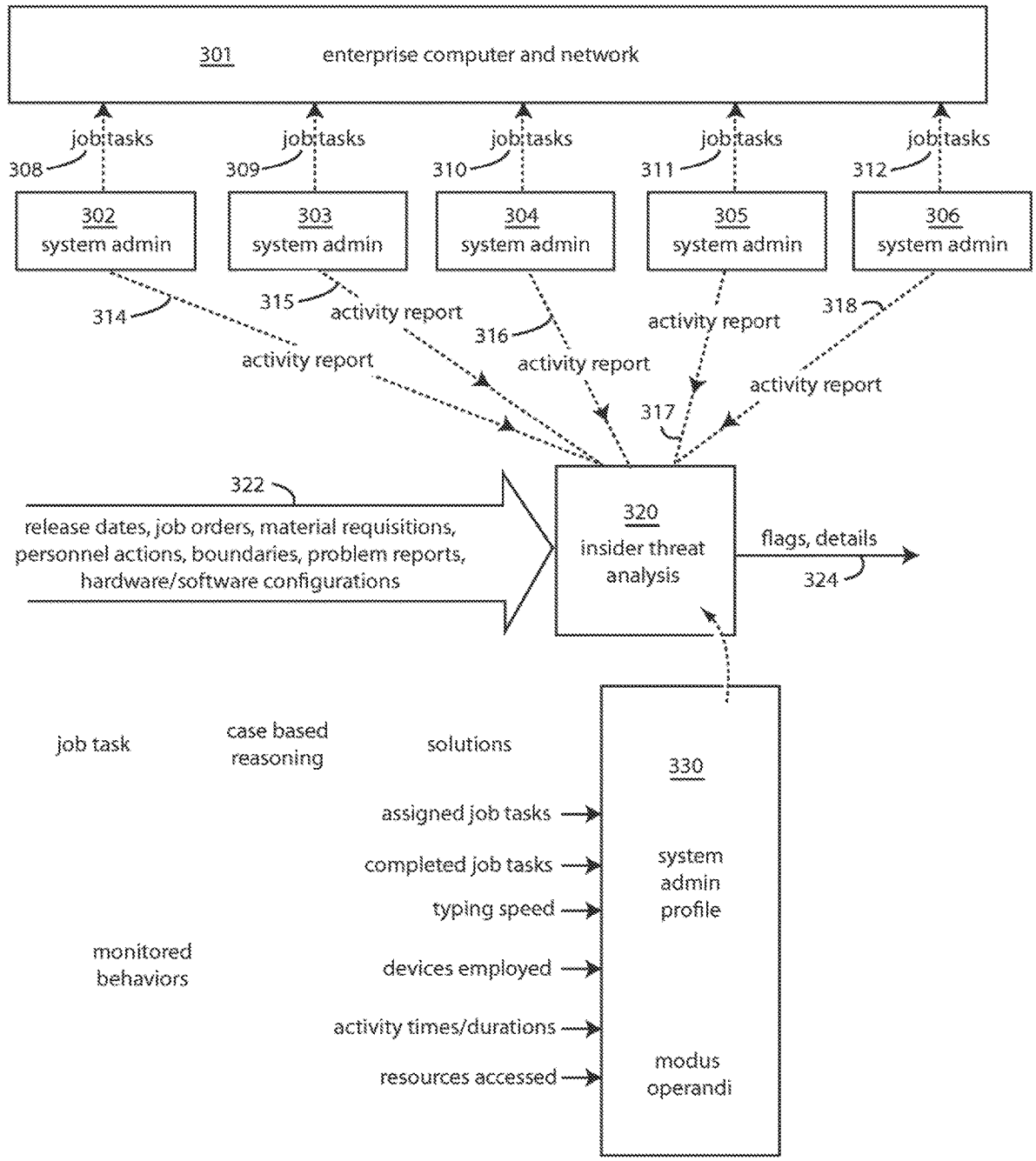
FIG. 3 is a functional block diagram of a protected enterprise that includes an enterprise computer and network maintained and controlled by several authorized system admins.

Referring now to FIG. 3, a protected enterprise 300 includes an enterprise computer and network 301 maintained and controlled by, e.g., five authorized system administrators 302-306. Each system administrator 302-306 is assigned jobs that they then complete as job-related tasks 308-312 directed within the protected enterprise computer network 300. Activity reports 314-318 related to each system administrator 302-306 automatically issue to an insider threat analysis device 320.

The insider threat analysis device 320 is an embodiment of the present invention that can be integrated into an otherwise already existing and conventional operation. It will ordinary include hundreds if not thousands of uniquely assigned smart-agents 200. In an optimum configuration, insider threat analysis device 320 receives automated software update release dates, company official job orders, approved material requisitions, confidential personnel actions, security boundaries, customer problem reports, protected enterprise computer network hardware/software configurations, and other corroborating input information 322.

A management information system (MIS) is a computerized database of financial information organized and programmed in such a way that it produces regular reports on operations for every level of management in a company. It is also usually possible to obtain special reports from MIS systems. Many of the job tasks 308-312 operating on protected enterprise computer network 300 will have corresponding MIS facts that can be used to expect, verify, corroborate, confirm, or otherwise validate an activity report 314-318. Activities that should have been expected, verifiable, supportable, confirmable, attestable, or otherwise provable, but were not, are reasons to output flags and details 324.

In a unique and novel aspect, activity reports 314-318 that reflect behaviors outside "normal" behavior for the corresponding system administrator 302-306 will be more telling reasons to output flags and details 324. The insider threat analysis device 320 could be expected to provide meaningful output flags and details 324 even if no information at input 322 was forthcoming.

The information must be transformed into a format that insider threat analysis device 320 can operate on. Specifically, data is categorized and tallies for each category are stored in memory for comparisons later. For example, software release dates can be categorized by the number of days the software has been released, or by the month/year of its release. Job task categories were categorized above, and activities in activity reports can be categorized as well.

In general, an insider threat analysis device embodiment of the present invention is connected into an enterprise's protected computer network such that a series of activity reports of system administrators can be securely collected and securely stored in memory. Particular aspects of the series of activity reports are selected, categorized, and the results tabulated. Each corresponding individual system administrator is profiled by a smart-agent with memory storage by the tabulated results obtained over time from many activity reports related to an individual system administrator. In FIG. 3, this is represented by system administrator profile 330.

A type of biometric is important to be sensed for each corresponding individual system administrators from indications discernible from any of the activity reports. Various devices for sensing a biometric are able to detect at least one of a keyboard typing speed, system tools employed, scripts used, time of activity and duration, and the particular workstations used.

At least one biometric previously sensed is compared to a corresponding one currently being sensed. A behavior processor then determines if the biometrics sensed were unlikely to have been produced by the same original system administrator. If some aspect of a system administrator's behavior is unusual given the profile maintained for them by the smart-agent, a misbehaving-system-admin security alert is output. Such can occur if an activity report concludes in tabulated results for a corresponding individual system administrator that deviate substantially from said profile of tabulated results obtained over time.

Considering now FIG. 4, a series of activity reports #001-#014 are filtered for a selected parameter, e.g., typing speed at the system administrator's keyboard. Such would be tracked as an attribute of the smart-agent for that system administrator and maintained in a long term profile.

In order to save having to compute each parameter for comparison in realtime, each selected parameter is categorized into ranges and the ranges are populated into a tabulation maintained in memory. The whole represents a simple one-dimension profile useful to a smart-agent. It can be seen by simple visual inspection that the vast majority of selected parameter measurements categorize to range-3 and range-4. Activity report #003 produced a range-7 tabulation that is the most extreme. An adjustable trigger can be set so the deviation is enough to produce a misbehaving-system-admin security alert output.

In general, embodiments of the present invention have three analytical objectives: 1. Analyze the general behavior of the system administrator; 2. Analyze the activities of the system administrator and compare their pertinence to each job queued (lists of Jobs) to be completed by the system administrator; and 3. Intrusion detection.

Intrusion detection systems (IDSs) can be divided into two categories, network-based and host-based. Network-based systems (NIDS) listen on the network and monitor individual data packets flowing through a network. NIDS's often require dedicated hosts and special equipment vulnerable to network attacks. Host-based intrusion detection systems (HIDS) deal with each individual host and monitor the system in real-time to detect abnormal behavior and other activities such as repeated failed access attempts, changes to critical system files log files, etc. HIDS clients can be installed on every host on a network and tailored to the specific host's configuration. They then watch for anomalies and abuses of the systems.

Embodiments of the present invention combine smart-agents, case based reasoning, business rules, real-time and long-term profiling, and fuzzy logic.

Each system administrator job is assigned to and represented by a smart-agent, as are every task and task that are expected to be completed are associated as attributes. Each activity/task represented by a smart-agent is automatically linked to all the job smart-agents that they need to do.

Each job is linked to all the potential activities that are related to them and each activity/task is interconnected with all the system administrator jobs that also use those tasks and activities.

A job clock is started at the beginning of each job. All the smart-agents corresponding to that job are triggered or "born", and are assigned an age attribute of "1" and a completion time attribute. Every time an activity or task is completed, all the jobs that normally can benefit from such tasks are also triggered. The job clock thereafter advances the smart-agents cycle-by-cycle. The age of any of the jobs so triggered can be read and will be the number of job clock cycles since its activation by a system administrator. If there is a job problem, an objection will issue.

There are three basic types of objections:
(1) Task-omission objections are triggered by tasks that should have been completed by the system administrator but were not;
(2) Uncalled-for task objections are triggered by any task that should not have been used, because it is not related to the job or the current situation, but was completed anyway by the system administrator. Excess objections are also triggered by prematurely completed tasks that required a pre-requisite, but missing, activity;
(3) Priority task-order objections are triggered by tasks that should have been completed in order sooner, or critical tasks related to the job were not completed, or less critical tasks are being completed first, or task completions are not following the proper order.

The number of, and the importance of, and the criticality of the other tasks that should have been completed before the offending task that was chosen by the system administrator are combined to give a weight that is then used to compute a compliance level.

As soon as any job is assigned to a particular system admin, all the corresponding tasks that must be completed for that job are triggered and the job clock runs. The tasks that follow must be completed in proper time and proceed in proper order.

When a system administrator is completing tasks not related to the job or not in the right order a security alert will be triggered. Any critical task not related to the job will generate a security alert if the system administrator is trying to complete the action/task.

If the system administrator is following a path, or sequence of actions that could be related to the current job, the system may accept this behavior as normal. But, no critical tasks related to the current job can be missed, and no critical actions should be undertaken that are not related to the current job.

If the system administrator is supposed to complete a specific job then all the task smart-agents related to this job will be expecting to be triggered according to a fixed order (age).

When a job smart-agent is triggered to start, all the task smart-agents anticipated to begin straightaway are in turn triggered and initialized with an age of "1". If the system administrator in fact completes all the expected tasks by age-1, then the work that was done is considered to be in compliance. Otherwise, all the task smart-agents that were supposed to run in the first cycle but were stood up will file a objection. A security alert is sent to a judging module that scores the system administrator's work compliance. The offending system administrators can either be allowed to continue, or they can be disconnected and sidelined. The severity of their offenses makes the difference.

Not all system administrators will complete all the expected tasks related to a particular job in the same order. If a few of the tasks that were expected to transpire in any cycle did not, the system administrator may nevertheless have some latitude in getting to them later.

The judging module will return a confidence score. If the score exceeds a minimum confidence threshold, the system administrator will be allowed to continue to the next cycle and all the activities expected that were not completed will increase their age. When the system administrator completes the next new task, this task too will assess its relation to the job at hand.

The kit of tasks that can be combined to do a job is automatically learned from what is the norm for the group.

Some jobs may be completed in more than one way. Independent system administrators will often use their own mix of favorite techniques. For example, given seven different tasks (t1-t7) and eight individual system administrators (SA1-SA8), the table below represents the task they chose to complete a typical job.

|     | T1 | T2 | T3 | T4 | T5 | T6 | T7 | T8 | T9 | Total |
|-----|----|----|----|----|----|----|----|----|----|-------|
| SA1 | 1  | 1  | 0  | 0  | 0  | 1  | 0  | 1  | 1  | 5/9   |
| SA2 | 1  | 1  | 0  | 0  | 0  | 0  | 0  | 0  | 1  | 3/9   |
| SA3 | 1  | 1  | 0  | 1  | 1  | 0  | 0  | 0  | 1  | 5/9   |
| SA4 | 0  | 0  | 0  | 0  | 0  | 0  | 0  | 1  | 0  | 1/9   |
| SA5 | 1  | 0  | 0  | 1  | 1  | 0  | 0  | 0  | 1  | 4/9   |
| SA6 | 1  | 1  | 0  | 1  | 1  | 1  | 0  | 1  | 0  | 6/9   |
| SA7 | 1  | 1  | 0  | 1  | 1  | 1  | 0  | 0  | 0  | 5/9   |
| SA8 | 1  | 1  | 0  | 1  | 1  | 1  | 0  | 0  | 1  | 6/9   |

Clearly, something is definitely odd about SA4, and SA2 is suspect. From this table the tasks can be inversely related to the corresponding system administrators that used them.

|    | SA1 | SA2 | SA3 | SA4 | SA5 | SA6 | SA7 | SA8 | Total |
|----|-----|-----|-----|-----|-----|-----|-----|-----|-------|
| T1 | 1   | 1   | 1   | 0   | 1   | 1   | 1   | 1   | 7/8   |
| T2 | 1   | 1   | 1   | 0   | 0   | 1   | 1   | 1   | 6/8   |
| T3 | 0   | 0   | 0   | 0   | 0   | 0   | 0   | 0   | 0/8   |
| T4 | 0   | 0   | 1   | 0   | 1   | 1   | 1   | 1   | 5/8   |
| T5 | 0   | 0   | 1   | 0   | 1   | 1   | 1   | 1   | 5/8   |
| T6 | 1   | 0   | 0   | 0   | 0   | 1   | 1   | 1   | 4/8   |
| T7 | 0   | 0   | 0   | 0   | 0   | 0   | 0   | 0   | 0/8   |
| T8 | 1   | 0   | 0   | 1   | 0   | 1   | 0   | 0   | 3/8   |
| T9 | 1   | 1   | 1   | 0   | 1   | 0   | 0   | 1   | 5/8   |

Here, t1 was employed by all except SA4; t2 was employed by all except SA4 and SA5. T3 and t7 were ignored by all system administrators.

Such allows the following rule to be defined: [0109] A first list L1 of system administrators "I" is said to be more global than a second list L2 of system administrators "J" if all its system administrators also completed all the tasks in list "I", and is noted as [[ ]], in our example: [0110] L1 [[ ]] L2 [0111] L1 Non [[ ]] L6. [0112] The notion of being global is transitive [0113] L1 [[ ]] L2 et L2 [[ ]] L8 . . . a L1 [[ ]]L8 [0114] The list of tasks is sorted according to the number of system administrators that use them. If two lists are identical (4 et 5), only one is kept, but remembering the redundancy is important.

The preferred tasks are on top. [0116] CREATION of the CLUSTERS of Tasks [0117] Creation of the Analysis Matrix CLU (I, J) [0118] Line=tasks [0119] Column=Tasks+SAD+ Test [0120] If TASK(ij) [[ ]] TASK(i+1 j) then CLU(i i+1)=1 & CLU(i+1 test)=CLU(i+1 test) U CLU(i test). [0121] Task8 include itself and in task 6 as a result [0122] CLU (Task8 Task8)=1 [0123] CLU (Task8 Task6)=1 [0124] CLU (task6 test)=1,4,6 [0125] Each line that includes another line will excluded unless CLU(Task, ADM) is different to CLU (task, test)

|         | task-8 | task-4 | Task 5 | task-6 | task-9 | task-2 | task-1 | SAD              | C                    |
|---------|--------|--------|--------|--------|--------|--------|--------|------------------|----------------------|
| task-8  | 1      |        |        | 1      |        |        |        | 1, 4, 6          |                      |
| task-4  |        | 1      | 1      |        |        |        | 1      | 3, 5, 6, 7, 8    |                      |
| Task 5  |        |        |        |        |        |        |        | 3, 5, 6, 7, 8    |                      |
| task-6  |        |        |        | 1      |        |        |        | 1, 4, 6, 7, 8    | 1, 4, 6              |
| task-9  |        |        |        |        | 1      |        | 1      | 1, 2, 3, 5, 8    |                      |
| task-2  |        |        |        |        |        | 1      | 1      | 1, 2, 3, 6, 7, 8 |                      |
| task-1  |        |        |        |        |        |        |        | 1, 2, 3, 5, 6, 7, 8 | 3, 5, 6, 7, 8:1, 2, . . . |

The following four clusters are generated: 1. {task8, task6}; 2. {task4, task5, task1}; 3. {task9, task 1}; 4. {task2, task1}.

Each system administrator will perform one or more clusters. All task of a cluster must be performed.

Data Mining and neural networks use a large, frequently updated database of known attack signatures to construct a decision tree for detecting attacks with known signatures.

Real-time Profiling analyzes the current activities of the system administrator will be compared the long-term profiles of the system administrator learned from the previous activities by the . . . week, month, year.

An important component of case based reasoning is the case archives where the previously experienced tasks and jobs are stored with a list of actions, tasks, and activities in one case. Each line of a case describes one feature, action, and/or task in the case. When a job is listed in the tasks assigned to a system admin, the cases related to this job are activated. This monitors the activities of the system administrator and measures any similarity between the matching features of the cases related to the selected cases and the actions activities completed by the system administrator. The returned cases are ranked according to their degrees of similarity to the given problem.

Although particular embodiments of the present invention have been described and illustrated, such is not intended to limit the invention. Modifications and changes will no doubt become apparent to those skilled in the art, and it is intended that the invention only be limited by the scope of the appended claims.

I claim:

1. A computer-implemented method for detecting unauthorized activities on a network, comprising:
   receiving, at one or more processors, an activity report comprising data regarding one or more actions performed by a system administrator on the network;

retrieving, via the one or more processors, a plurality of task smart agents corresponding to a job of the system administrator, each of the plurality of task smart agents including a long-term profile establishing at least one normal value for an attribute of a corresponding task based on historical performance of the job by the system administrator;

determining, via the one or more processors, that the activity report data reflect one or more deviations by the system administrator from the normal values for the attributes of the plurality of task smart agents, the one or more deviations respectively being of least a corresponding threshold degree;

generating, via the one or more processors, an output flag for each of the one or more deviations;

submitting, via the one or more processors, the one or more output flags to a judging module;

issuing, via the one or more processors and based on the one or more output flags, a lockout output restricting access to the network by the system administrator.

2. The computer-implemented method of claim 1, wherein the plurality of attributes corresponding to the plurality of long-term profiles relate to at least one of the following: whether one of the plurality of corresponding tasks is normally undertaken by the system administrator in connection with the job; how often one of the plurality of corresponding tasks is normally undertaken by the system administrator in connection with the job; and at least one proper ordering of the plurality of corresponding tasks relative to one another as normally undertaken by the system administrator in connection with the job.

3. The computer-implemented method of claim 1, wherein determining the one or more deviations includes using a job clock to measure deviation from one or more normal values for at least one of the following age attributes: amount of time for completion of one of the plurality of corresponding tasks; number of corresponding actions by the system administrator associated with completion of one of the plurality of corresponding tasks; amount of time for beginning one of the plurality of corresponding tasks; and number of corresponding actions by the system administrator associated with beginning one of the plurality of corresponding tasks.

4. The computer-implemented method of claim 3, wherein the job clock utilizes a state machine that measures clock cycles.

5. The computer-implemented method of claim 1, wherein the plurality of attributes corresponding to the plurality of long-term profiles relate to at least one of the following: the normal range of typing speeds observed for the system administrator in connection with performing the job; the tools normally implemented by the system administrator in connection with performing the job; how long the system administrator typically takes to perform one or more of the plurality of corresponding tasks of the job; the typical workstations utilized by the system administrator to perform the job; and the time of day during which the system administrator typically performs the job.

6. The computer-implemented method of claim 1, further comprising— retrieving, via the one or more processors, a recursive task smart agent including a long-term profile establishing at least one normal value for an attribute of one of the plurality of corresponding tasks based on historical performance of the job by a plurality of peers of the system administrator;

determining, via the one or more processors, that the activity report data reflect a deviation by the system administrator from the at least one normal value for the attribute of the one of the plurality of corresponding tasks associated with the recursive task smart agent, the deviation assessed in connection with the recursive task smart agent being of at least a corresponding threshold degree;

generating, via the one or more processors, an output flag for the deviation assessed in connection with the recursive task smart agent;

submitting, via the one or more processors, the output flag assessed in connection with the recursive task smart agent to the judging module;

generating, via the one or more processors, a confidence score based on the one or more output flags assessed in connection with the corresponding ones of the plurality of task smart agents and on the output flag assessed in connection with the recursive task smart agent, the lockout output being based on the confidence score.

7. The computer-implemented method of claim 1, wherein the one or more actions comprise issuance of at least one of the following commands: read, write, execute program, print, and display.

8. The computer-implemented method of claim 1, further comprising— matching, via the one or more processors, the activity report to a malicious pattern using a signature recognition processor, the signature recognition processor being configured to recognize and classify known patterns of malicious behavior, the lockout output being based on the match.

9. The computer-implemented method of claim 1, further comprising validating, via the one or more processors, the activity report data by comparison against one or more facts obtained from a management information system.

10. The computer-implemented method of claim 1, further comprising defining, via the one or more processors, the plurality of attributes of the plurality of corresponding tasks using case-based reasoning.

11. At least networked computer for detecting unauthorized activities on a network, comprising:

one or more processors; and a non-transitory computer-readable storage media having computer-executable instructions stored thereon, wherein when executed by the one or more processors the computer-readable instructions cause the one or more processors to— receive an activity report comprising data regarding one or more actions performed by a system administrator on the network;

retrieve a plurality of task smart agents corresponding to a job of the system administrator, each of the plurality of task smart agents including a long-term profile establishing at least one normal value for an attribute of a corresponding task based on historical performance of the job by the system administrator;

determine that the activity report data reflect one or more deviations by the system administrator from the normal values for the attributes of the plurality of task smart agents, the one or more deviations respectively being of least a corresponding threshold degree;

generate an output flag for each of the one or more deviations;

submit the one or more output flags to a judging module;

issue, based on the one or more output flags, a lockout output restricting access to the network by the system administrator.

12. The networked computer of claim 11, wherein the plurality of attributes corresponding to the plurality of long-term profiles relates to at least one of the following: whether one of the plurality of corresponding tasks is normally undertaken by the system administrator in connection with the job; how often one of the plurality of corresponding tasks is normally undertaken by the system administrator in connection with the job; and at least one proper ordering of the plurality of corresponding tasks relative to one another as normally undertaken by the system administrator in connection with the job.

13. The networked computer of claim 11, wherein determining the one or more deviations includes using a job clock to measure deviation from one or more normal values for at least one of the following age attributes: amount of time for completion of one of the plurality of corresponding tasks; number of corresponding actions by the system administrator associated with completion of one of the plurality of corresponding tasks; amount of time for beginning one of the plurality of corresponding tasks; and number of corresponding actions by the system administrator associated with beginning one of the plurality of corresponding tasks.

14. The networked computer of claim 13, wherein the job clock utilizes a state machine that measures clock cycles.

15. The networked computer of claim 11, wherein the plurality of attributes corresponding to the plurality of long-term profiles relates to at least one of the following: the normal range of typing speeds observed for the system administrator in connection with performing the job; the tools normally implemented by the system administrator in connection with performing the job; how long the system administrator typically takes to perform one or more of the plurality of corresponding tasks of the job; the typical workstations utilized by the system administrator to perform the job; and the time of day during which the system administrator typically performs the job.

16. The networked computer of claim 11, wherein the computer-executable instructions further cause the at least one processor to—
retrieve a recursive task smart agent including a long-term profile establishing at least one normal value for an attribute of one of the plurality of corresponding tasks based on historical performance of the job by a plurality of peers of the system administrator;
determine that the activity report data reflect a deviation by the system administrator from the at least one normal value for the attribute of the one of the plurality of corresponding tasks associated with the recursive task smart agent, the deviation assessed in connection with the recursive task smart agent being of at least a corresponding threshold degree;
generate an output flag for the deviation assessed in connection with the recursive task smart agent;
submit the output flag assessed in connection with the recursive task smart agent to the judging module;
generate a confidence score based on the one or more output flags assessed in connection with the corresponding ones of the plurality of task smart agents and on the output flag assessed in connection with the recursive task smart agent, the lockout output being based on the confidence score.

17. The networked computer of claim 11, wherein the one or more actions comprise issuance of at least one of the following commands: read, write, execute program, print, and display.

18. The networked computer of claim 11, wherein the computer-executable instructions further cause the at least one processor to—
match the activity report to a malicious pattern using a signature recognition processor, the signature recognition processor being configured to recognize and classify known patterns of malicious behavior, the lockout output being based on the match.

19. The networked computer of claim 11, wherein the computer-executable instructions further cause the at least one processor to validate the activity report data by comparison against one or more facts obtained from a management information system.

20. The networked computer of claim 11, wherein the computer-executable instructions further cause the at least one processor to define the plurality of attributes of the plurality of corresponding tasks using case based reasoning.

* * * * *